Feb. 10, 1931.  T. G. NYBORG ET AL  1,791,835
BELT CONVEYER
Filed Feb. 13, 1929
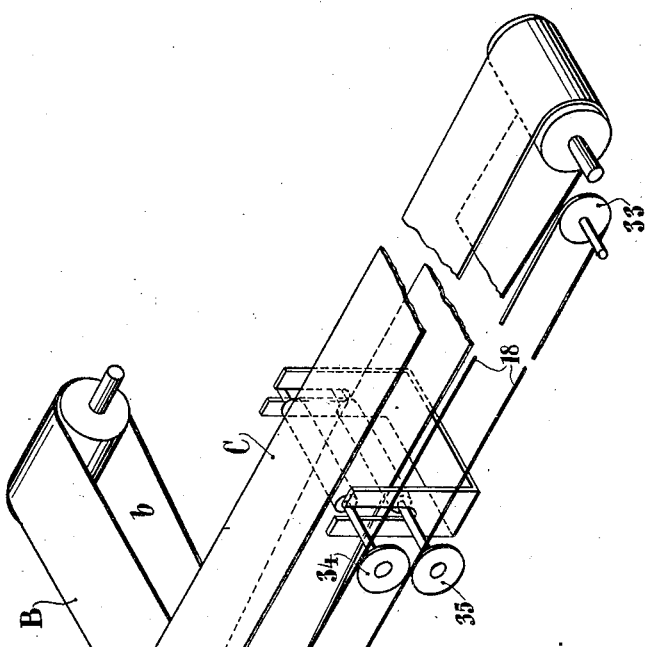
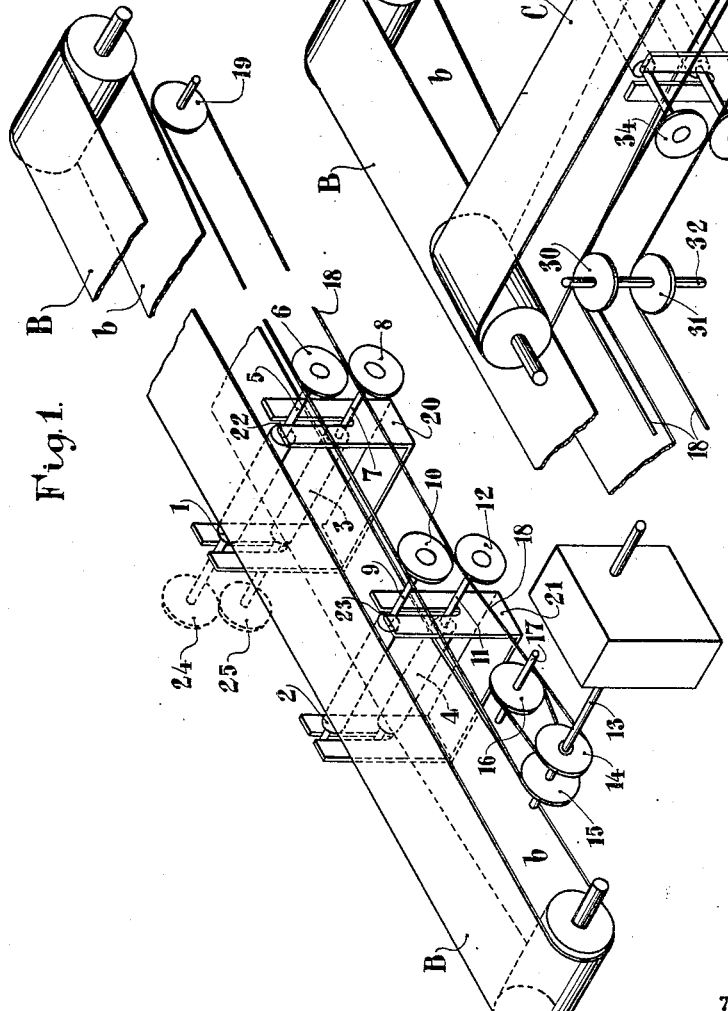
Inventors
TAGE GEORG NYBORG,
MARK FREDERICK HIGGINS,
BY
Toulmin & Toulmin
Attorneys Patented Feb. 10, 1931

1,791,835

UNITED STATES PATENT OFFICE

TAGE GEORG NYBORG AND MARK FREDERICK HIGGINS, OF WORCESTER, ENGLAND

BELT CONVEYER

Application filed February 13, 1929, Serial No. 339,569, and in Great Britain February 24, 1928.

This invention relates to belt conveyers, and has for object to provide an improved drive for conveyers of this kind specially adapted to facilitate the operation of such conveyers over considerable distances, that is, conveyers of great length.

In a belt conveyer made according to the present invention the driving force is transmitted to the belts solely and directly from intermediate carrying rollers, the said driving force varying with the weight of the belt or band, and of the material conveyed thereon.

The invention will now be described with reference to the accompanying drawings, Fig. 1 of which is a diagrammatic representation of the main elements of the arrangement in proper co-ordination and correlation;

Fig. 2 is a modification of the arrangement shown in Fig. 1.

Referring to Fig. 1 of the drawings, top rollers such as those shown at 1 and 2 are arranged to carry the upper or operative strand B of the belt, while bottom rollers such as those shown at 3 and 4 carry the lower or return strand b.

On an extension of the shaft 5 of the upper roller 1 is fixed a driving disc or pulley 6, and on the extension of the shaft 7 of the lower roller 3 is fixed a driving disc or pulley 8. Similarly, the extension of the shaft 9 of the upper roller 2 carries a driving disc or pulley 10, while the shaft 11 of the lower roller 4 carries a driving disc or pulley 12.

On the driving shaft 13 which is geared to the driving motor (not shown) are mounted two driving pulleys (or several pulleys may be employed if found necessary) 14 and 15 alongside of one another, while another pulley 16 is fixed upon an intermediate shaft 17.

An endless rope 18 is led over the driving pulley 14 and thence over the intermediate pulley 16 and back to the pulley 15 whence the rope is led alongside the conveyer belt B, b, and over the pulleys 10 and 6 arranged upon the ends of the shafts 9 and 5 of the upper rollers 2 and 1 respectively. After passing round the driving pulley 19 on the extreme end roller carrying the operative strand B of the belt or a special tension roller the endless rope 18 is led back over and in engagement with the series of pulleys, such as 8 and 12, fixed upon the corresponding ends of the shafts of the bottom rollers carrying the return strand b of the belt. The shafts, such as 5 and 9, of the upper rollers 1 and 2 carrying the upper strand B of the belt are supported in bearings 20, 21 having vertical slots 22, 23 in which the said shafts are arranged above the corresponding shafts 7 and 11 of the bottom rollers 3 and 4.

The driving pulley 6 on the shaft 5 of the top roller 1 therefore rests on the driving rope 18 carried by the pulley 8 on the shaft 7 of the bottom roller 3. Hence the driving force applied to the upper rollers 1 and 2 will have a definite relation to the weight carried by the operative strand B of the belt and by the said top rollers, plus the weight of the driving rope 18.

The driving force applied to the bottom rollers 3 and 4 will have a definite relation to the total weight of the driving rope 18 plus the weight carried by the top rollers 1 and 2. The shafts on the carrying rollers may have wheels 24 and 25 fitted as indicated in dotted lines on shafts 5 and 7 so that the driving force on the bottom roller can be transmitted to the top roller.

The arrangement is such that the speed of the endless driving rope 18 may be considerably greater than that of the conveyer belt B, b, so that a relatively light driving rope can be used for a given conveyer by choosing the correct proportion between the diameters of the driving pulleys on the shafts of the rollers and the diameters of the said rollers. In this manner the tractive force on the driving pulleys can always be made to exceed the retarding force acting on the rollers.

In the modification shown in Fig. 2 a second belt C can be used to co-operate with and load on to the belt B, this second belt C being at any suitable angle to the belt B in which case the roller 19 would be replaced by two rollers 30 and 31, each arranged in a parallel plane at right angles to the plane of the roller 19 as shown; the endless rope 18 being combined in parallel relation to the second belt C and passing over an end roller 33. The second belt is also provided with driving discs or pulleys 34 and 35 similar to those described with reference to Fig. 1.

By the use of the present invention an economy is effected since the applied force varies directly with the weight of the belt or band and of the material conveyed thereon. It should be clearly understood that the necessary number of driven rollers depends upon the inclination of the conveyer.

What we claim and desire to secure by Letters Patent is:—

1. In a belt conveyer comprising a belt, end rollers supporting the belt at the ends, and upper and lower intermediate belt supporting rollers, means for varying the drive automatically with the load carried: the said means comprising vertically adjustable pulleys fixed to the said upper and lower rollers and a driving rope adapted to be pressed on to the pulleys fixed to the lower rollers under the action of the load on the belt.

2. In a conveyer according to claim 1 brackets supporting the upper and lower rollers, vertical recesses in the said brackets adapted to accommodate the spindles of said rollers.

3. A belt conveyer according to claim 1 in combination with a similar conveyer disposed at an angle thereto, and a single rope drive common to both the conveyers.

In testimony whereof we affix our signatures.

TAGE GEORG NYBORG.
MARK FREDERICK HIGGINS.